Patented Oct. 10, 1922.

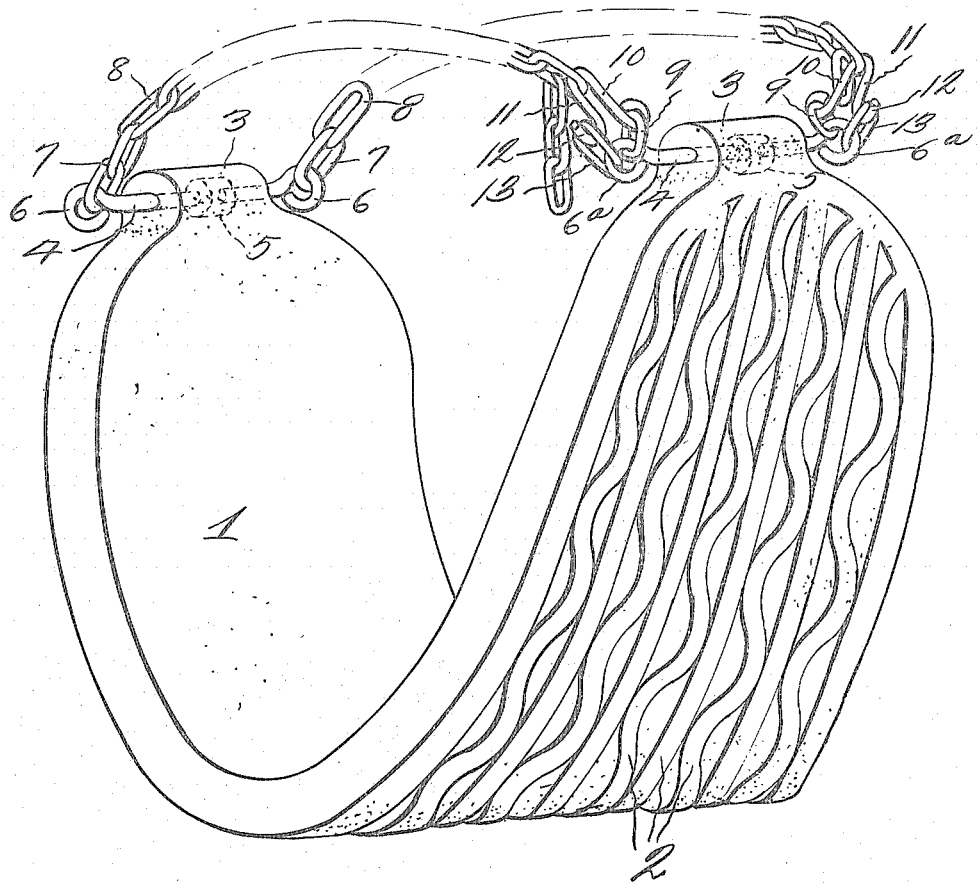
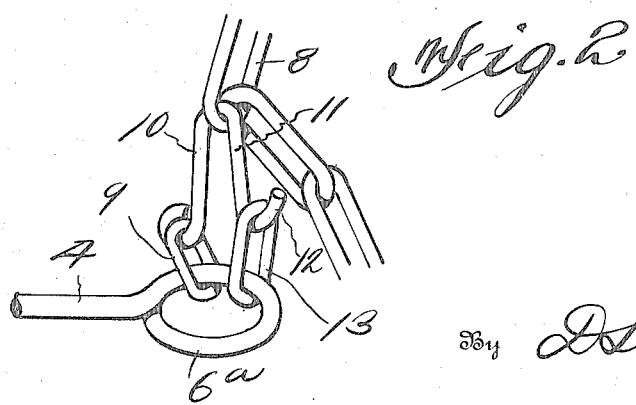

1,431,484

UNITED STATES PATENT OFFICE.

GEORGE A. PAYNE, OF CONNELLSVILLE, PENNSYLVANIA.

ANTISKID DEVICE.

Application filed March 29, 1922. Serial No. 547,758.

*To all whom it may concern:*

Be it known that I, GEORGE A. PAYNE, a citizen of the United States, residing at Connellsville, in the county of Fayette, State of Pennsylvania, have invented a new and useful Antiskid Device; and I do hereby declare the following to be a full, clear, and exact description of the invention, such as will enable others skilled in the art to which it appertains to make and use the same.

The invention relates to antiskid devices for automobile wheels, and has for its object to provide a device of this character comprising a sheet of flexible material adapted to be bent around the tire tread and provided with lugs having bars imbedded therein, the ends of which are provided with eyes for the reception of chains adapted to arch and extend over the wheel felly to be secured together thereby securing the device on the tire.

A further object is to provide a flexible member with transversely disposed ribs adapted to bite into the ground for additionally preventing skidding.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a perspective view of the antiskid device.

Figure 2 is an enlarged detail perspective view of one of the chain securing members.

Referring to the drawings, the numeral 1 designates a segmentally shaped tire shoe preferably formed from pliable material, such for instance as rubber and 2 transversely disposed ribs adapted to bite into the ground for additionally preventing skidding of the wheel. The ends of the member 1 are provided with integral lugs 3 in which lugs are imbedded the bars 4, said bars being provided with enlargements 5 for preventing longitudinal movement of the bars 4. The ends of the bars 4 are provided with eyes 6 and 6$^a$ and connected to the eyes 6 are the ends 7 of chains 8, which chains are adapted to arch the felly of a wheel and securely hold the tire shoe 1 in engagement with the tire, and on the wheel in such a manner that it will not slip. Secured to the eyes 6$^a$ by means of links 9 are U-shaped securing hooks 10, the arms 11 of which are adapted to be passed through any of the links in the chains 8 as shown in Figure 1, and securely hold the device against the flexing action of the tire shoe 1 after it has been bent around the tire. To prevent accidental disconnection of the hooks 10, the arms 11 are provided with hooks 12, which hooks after being passed through the link in the chain 8 are hooked in the links 13 carried by the eyes 6$^a$, thereby securely holding the device in such a manner that it will not come unhooked.

From the above it will be seen that a tire shoe is provided, which may be easily and quickly applied, and one that is positive in its operation, also that a tire shoe is provided which is formed from pliable material which may be allowed to straighten out for storage purposes. It will also be seen that a strain is on the securing chains at all times, thereby preventing rattling of the chain as the vehicle wheel moves over the ground.

The invention having been set forth what is claimed as new and useful is:—

1. A tire shoe comprising an elongated flexible member, transversely disposed bars imbedded in the ends of said flexible member, said bars terminating in eyes, chains connected to the eyes of one of said bars, U-shaped fastening devices carried by the eyes of the other bar and adapted to be passed through links of the chains, means for fastening the free arms of the U-shaped fastening devices to the eyes, said bars being provided with enlargements imbedded in the ends of the flexible members.

2. A tire shoe comprising an elongated flexible member adapted to be bent over the tread of a tire transversely, bars imbedded in the ends of the elongated member and extending transversely, the ends of said bars terminating in eyes, securing chains secured to the eyes of one of said bars and means for detachably connecting the other ends of the chains to the eyes of the other bar.

In testimony whereof I have signed my name to this specification in the presence of two subscribing witnesses.

GEORGE A. PAYNE.

Witnesses:
CHAS. J. LINCOLN,
HARRY C. GREGG.